United States Patent
Westergaard et al.

(10) Patent No.: US 9,109,576 B2
(45) Date of Patent: Aug. 18, 2015

(54) WIND TURBINE BLADE CONTROL

(75) Inventors: Carsten Hein Westergaard, Houston, TX (US); Niels Anker Olesen, Birkerod (DK); Chris Spruce, Leatherhead (GB)

(73) Assignee: Vestas Wind Systems A/S, Aarhus N. (DK)

( * ) Notice: Subject to any disclaimer, the term of this patent is extended or adjusted under 35 U.S.C. 154(b) by 931 days.

(21) Appl. No.: 13/257,132

(22) PCT Filed: Mar. 18, 2010

(86) PCT No.: PCT/GB2010/000486
§ 371 (c)(1),
(2), (4) Date: Jan. 20, 2012

(87) PCT Pub. No.: WO2010/106322
PCT Pub. Date: Sep. 23, 2010

(65) Prior Publication Data
US 2012/0134802 A1    May 31, 2012

Related U.S. Application Data

(60) Provisional application No. 61/161,284, filed on Mar. 18, 2009.

(30) Foreign Application Priority Data

Mar. 18, 2009  (GB) .................................. 0904687.1

(51) Int. Cl.
*F03D 7/02* (2006.01)
*F03D 11/00* (2006.01)

(52) U.S. Cl.
CPC .......... *F03D 7/0232* (2013.01); *F03D 11/0091* (2013.01); *F05B 2240/31* (2013.01);
(Continued)

(58) Field of Classification Search
CPC .......................... F03D 7/0232; F03D 11/0091
See application file for complete search history.

(56) References Cited

U.S. PATENT DOCUMENTS

| 7,324,016 B1 | 1/2008 | Milgram |
| 2006/0140764 A1* | 6/2006 | Smith et al. ................... 416/103 |

(Continued)

FOREIGN PATENT DOCUMENTS

| DE | 10 2006 041 461 | 3/2008 |
| EP | 1 460 266 | 9/2004 |

(Continued)

OTHER PUBLICATIONS

Joseph Mitchell; Search Report issued in priority Great Britain Application No. GB0904687.1; Jun. 26, 2009; 4 pages; Great Britain Intellectual Property Office.

(Continued)

*Primary Examiner* — Richard Edgar
(74) *Attorney, Agent, or Firm* — Wood, Herron & Evans, LLP

(57) ABSTRACT

A wind turbine variable is controlled by detecting air flow conditions in front of the leading edge of the blade. One or more Laser Doppler Anemometers are mounted on or incorporated into the blade to determine air flow velocity in the region in front of the leading edge of the blade. The measured flow conditions may be used to control the position of a control surface such as a trailing edge flap or the rotor speed. The LDAs may comprise lasers of different frequencies to enable more than one component of flow velocity to be measured.

17 Claims, 3 Drawing Sheets

(52) U.S. Cl.
CPC ....... *F05B2260/82* (2013.01); *F05B 2270/101* (2013.01); *F05B 2270/8042* (2013.01); *Y02E 10/721* (2013.01); *Y02E 10/722* (2013.01); *Y02E 10/723* (2013.01)

(56) References Cited

U.S. PATENT DOCUMENTS

| | | | |
|---|---|---|---|
| 2006/0145483 | A1 | 7/2006 | Larsen et al. |
| 2007/0003403 | A1* | 1/2007 | Pedersen et al. ............... 415/4.1 |
| 2009/0142192 | A1 | 6/2009 | LeClair et al. |
| 2010/0092291 | A1* | 4/2010 | Scholte-Wassink ............ 416/37 |
| 2010/0195089 | A1* | 8/2010 | Wu et al. ...................... 356/28.5 |

FOREIGN PATENT DOCUMENTS

| | | |
|---|---|---|
| EP | 2 175 281 | 4/2010 |
| GB | 2 398 841 | 9/2004 |
| GB | 2 428 748 | 2/2007 |
| GB | 2 440 954 | 2/2008 |
| JP | 11-125171 | 5/1999 |
| JP | 2006-125265 | 5/2006 |
| WO | 98/42980 | 10/1998 |
| WO | 2004/074681 | 9/2004 |
| WO | 2010/106322 | 9/2010 |

OTHER PUBLICATIONS

Joseph Mitchell; Examination Report issued in priority Great Britain Application No. GB0904687.1; Feb. 3, 2011; 1 page; Great Britain Intellectual Property Office.

Marco Balice; International Search Report and Written Opinion issued in priority International Application No. PCT/GB2010/000486; Mar. 7, 2011; 10 pages; European Patent Office.

* cited by examiner

WIND TURBINE BLADE CONTROL

The invention relates to wind turbines and, in particular, to the control of wind turbines, particularly but not exclusively, by controlling blade variables such as the aerodynamic profile of a blade.

There have been a number of proposals for use of flaps or ailerons in wind turbine blades to provide additional control in reaction to changing wind conditions. Trailing edge flaps are particularly attractive to designers of large modern wind turbines as they are useful in controlling random turbulence loading and asymmetrical loading, both of which are problems which increase with blade length.

In order to control the flaps, knowledge of oncoming wind conditions is desirable. It is known to monitor the wind conditions in the region in front of the blade in order to provide the necessary data for control.

An example of such a control system is disclosed in WO 2004/074681 which describes controlling flaps using measurements taken by a 5-hole pitot tube mounted in front of the blade at a distance from the hub. The pitot tube measures air pressure in front of the blade to determine the average flow velocity of oncoming wind.

The use of pitot tubes is disadvantageous as they tend to become obstructed and their performance degrades over time. In addition, since pitot tubes protrude from the wind turbine blade, they are prone to be hit by lightning. Generally, wind turbines are designed to require as little maintenance as possible and are often located in remote and hostile locations. Thus, a sensor such as a 5-hole pitot tube which may require frequent maintenance is unattractive.

The invention aims to provide an improved system and method for determining oncoming wind conditions which can be used to control wind turbines.

According to the invention there is provided a system for control of a wind turbine comprising a Laser Doppler Anemometer arranged at a rotor blade to measure air flow in the region of the leading edge of the blade, and a processor for determining therefrom a control signal for controlling the wind turbine. Laser doppler anemometry is a known technique for determining flow conditions by measuring the signal emitted from particles passing through an interference field generated by laser beams.

Laser doppler anemometry has the advantage that it can be used to detect flow conditions precisely. Thus the wind turbine can be effectively controlled in light of accurate air flow measurements. This may be done, for example, by controlling the blade's aerodynamic profile. Moreover, unlike a pitot tube, the technique does not substantially disturb the air being measured and thus interferes less with air flow over the blade. This is particularly advantageous for wind turbine designers who value efficient streamlined airflow over the blade.

Preferably, the Laser Doppler Anemometer (LDA) is provided in the blade, which has the advantage that the influence of the detection device on air flow over the blade is further decreased. In an embodiment a window is provided in the blade surface and the LDA is provided inside the blade, the LDA being arranged to emit a laser beam through the window. Since the windows may be made very small, their influence on the flow can be minimal.

The use of laser doppler anemometry also has the advantage that a number of inflow variables can be measured, and thus used to determine an appropriate control signal.

Preferably a LDA is used to measure more than one component of the air flow velocity vector.

Preferably a LDA is used to measure the angle of incidence of oncoming wind.

In embodiments of the invention a plurality of LDAs may be provided along a blade. Preferably the LDAs are spaced substantially equidistantly along the leading edge of the blade to provide an accurate picture of flow conditions across the entire length of the blade. An appropriate control signal may then be developed from a complete picture of the conditions along the blade.

The control signal may control a blade variable.

The wind turbine blade may comprise a moveable flap or other control surface and the control signal controls the position of the control surface. Preferably the control surface is a trailing edge flap.

The invention also provides a wind turbine having a control system as defined above. There is also provided a method for controlling a wind turbine comprising: measuring air flow in the region of the leading edge of the blade with a Laser Doppler Anemometer arranged at a rotor blade; determining therefrom a control signal based on the measurement; and applying the control signal to a variable wind turbine parameter to control the wind turbine.

A further aspect of the invention provides a system for control of a wind turbine comprising a Laser Doppler Anemometer arranged to measure air flow in the region of the leading edge of a rotor blade, and a processor for determining therefrom a control signal for controlling the wind turbine. This aspect of the invention also provides a method for controlling a wind turbine comprising measuring air flow in the region of the leading edge of the blade with a Laser Doppler Anemometer; determining therefrom a control signal based on the measurement; and applying the control signal to a variable wind turbine parameter to control the wind turbine.

Preferably, the Laser Doppler Anemometer comprises a laser source arranged at the wind turbine rotor hub and optic fibre arranged within the rotor blade for communicating laser light emitted by the laser source to at least one point along the leading edge of the blade.

Preferably, a plurality of optic fibres are arranged within a plurality of rotor blades, each optic fibre communicating laser light emitted by the laser source to at least one point along the leading edge of a respective rotor blade. Such an arrangement has the advantage that the high cost of multiple laser sources can be reduced by using the same source for multiple LDAs. A beam splitter or other multiplexer may be used to divide the beam emitted by the laser source.

Embodiments of the invention will now be described, by way of example only, and with reference to the accompanying drawings, in which.

Figure 1:
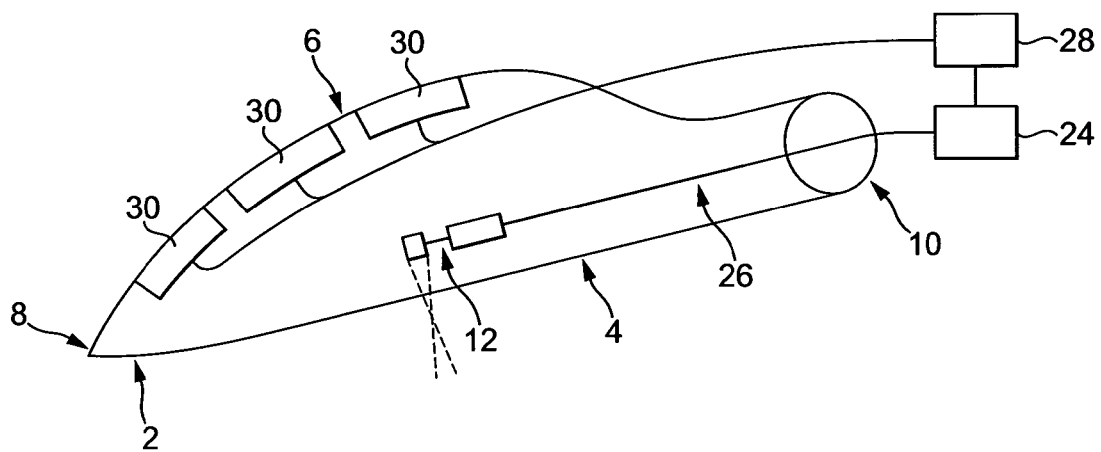
FIG. 1 illustrates an embodiment of the invention.

FIG. 1 shows a schematic view of a wind turbine blade. This blade may be a single piece blade, typically formed from two moulded halves, or of modular construction. It may also be provided with one or more control surfaces such as trailing or leading edge flaps, tip brakes, slats or spoilers. In this example, the blade is provided with a plurality of trailing edge flaps 30. The blade 2 has a leading edge 4, a trailing edge 6, a tip 8 and a root end 10. A Laser Doppler Anemometer (LDA) 12 is arranged at the leading edge 4 of the blade. The LDA may be mounted on, or provided in, the leading edge of the blade. Although only one LDA is shown in this embodiment, it will be appreciated that a plurality of LDAs may be provided. If there is a plurality of LDAs these may be evenly spaced along the length of the leading edge 4.

In the case where a plurality of LDAs are used, the LDAs may be spaced along the length of the blade, each providing a separate measurement. Alternatively, in order to reduce costs, LDAs may be used in combination with other cheaper and simpler flow measurement devices. In this case, one or more LDAs are arranged at the most important measurement points along the blade, and other devices are arranged at less important locations, for example, near the rotor hub where less energy is extracted from the wind. Where multiple LDAs, or a combination of one or more LDAs and other flow measurement devices is used, the flow information derived from one LDA may be weighted to take account of flow information derived from neighbouring LDAs or flow measuring devices.

Laser doppler anemometry is a technique for measuring flow conditions. For the avoidance of doubt, the term Laser Doppler Anemometer refers to any device using the principle of laser doppler anemometry.

Figure 2:
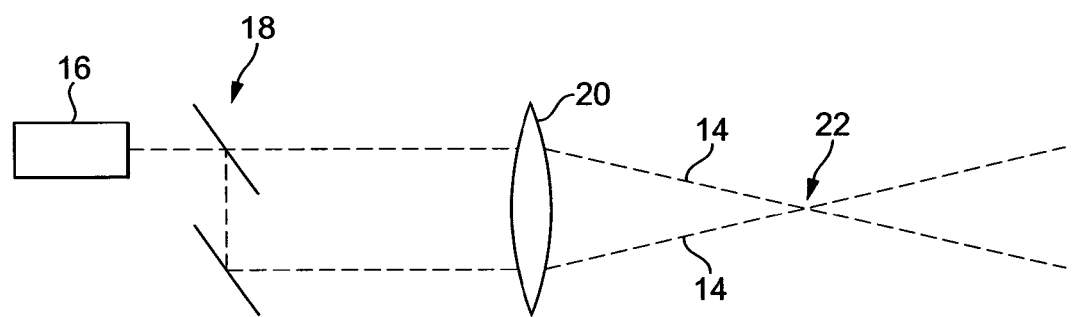
FIG. 2 shows an example of the a basic Laser Doppler Anemometer.

FIG. 2 shows an example of an LDA. Two laser beams 14 are arranged such that they cross at a predetermined distance from the device. In this example, the laser beams 14 are generated from a single laser 16 using a beam splitter and a Bragg cell 18. The beams are then focussed using lens 20 such that their paths cross. The region 22 where the beams intersect is called the measurement volume, and this is where flow velocity measurements are made.

The interference of the laser beams in the measurement volume creates a set of equally spaced fringes that are parallel to the bisector of the beams. When particles carried by the flow pass through the fringes they scatter light, the amount of which fluctuates as the particles travel through the fringes. The frequency of the fluctuation is thus proportional to the velocity of the particle normal to the fringes. We have appreciated that there are generally sufficient particles naturally carried in the wind for an LDA to operate on a wind turbine blade. The particles entrained in the air are mainly dust particles or water droplets.

The scattered light is detected by the LDA and then processed to determine flow parameters.

In the embodiment of FIG. 1, the LDA 12 is arranged to detect air flow in the region of the leading edge of the rotor blade 4. In particular the LDA is arranged to measure the air flow close to the blade surface, for example at only a few centimeters from the blade surface. However, the position at which the LDA is arranged to measure air flow can be varied. With reference to the example illustrated in FIG. 2, the position at which measurements are taken may be adjusted by adjusting the focal length of the lens 20 to vary the location of the measurement volume.

In this example, the LDA is positioned at the leading edge of the blade and therefore the laser beams may be emitted substantially perpendicular to the blade surface such that the measurement volume is provided in the region of the leading edge. However it will be appreciated that other configurations are possible. For example, the LDA may be located at different sites on the blade and the laser beams may be emitted and the scattered light received at a variety of locations.

Where multiple LDAs are used, it may be convenient and cost effective to share components between LDAs. For example, a single laser source may be used for two or more LDAs. This arrangement would require the laser output to be split into a separate beam for each LDA which may be achieved using well known techniques such as a beam splitter or other multiplexer. The signal may be fed from the beam splitter to a lens at a desired point on the blade by an optic fibre. In one embodiment, a single laser source may be mounted in the rotor hub and the laser beam split to provide a signal which is carried by optic fibres to one or more positions on each of the blades. Such an arrangement may require a relatively high power laser but could achieve considerable cost savings. It has the further advantage that delicate laser components are mounted in a place where they are more readily accessible for repair and maintenance than if located on the blades, possibly general tens of meters away from access points.

Referring to the embodiment of FIG. 1, the optical signal received by the LDA 12 is transmitted to a processor 24 by an optical fibre 26. Using a photodetector (not shown) the processor 24 converts the fluctuations in detected light intensity into fluctuations in a voltage signal from which the velocity of the flow can be determined. The air flow measurements, in turn, are used to determine a control signal for controlling the wind turbine. The wind turbine may be controlled, for example, by controlling a blade variable such as the aerodynamic profile of the blade. The aerodynamic profile may be changed by varying the position of a control surface. In the example of FIG. 1, the blade profile may be controlled by a control system 28 varying the position of the trailing edge flaps 30.

It will be appreciated that the LDA device described with reference to FIG. 2 above may be modified in a variety of ways, for example using one of a number of different known LDA systems.

The LDA described with reference to FIG. 2 can detect one component of the local flow velocity vector. In a preferred embodiment, laser doppler anemometry is used to detect two or more components of the local flow velocity vector. This may be achieved by using additional laser beams of different colour. Pairs of laser beams with different frequencies may be aligned such that their measurement volumes overlap. Many such methods are known in the art.

Figure 3:
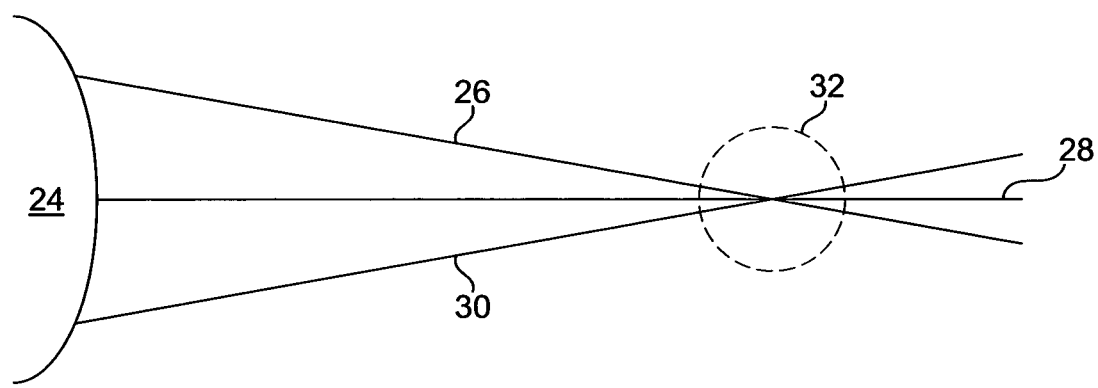
FIG. 3 shows an example of an LDA arrangement for measuring more than one component of the local air flow velocity vector.

FIG. 3 illustrates an example of a LDA arrangement which can be used to measure two components of the local oncoming air flow velocity vector.

Three laser beams 26, 28 and 30 are emitted out in front of the leading edge of the blade 24 by lasers (not shown) arranged to emit at substantially equidistantly spaced points along a straight line. The laser beams are all emitted in the same plane.

In this example, the first beam 26 is a green laser beam and the third beam 30 is a blue laser beam. The second laser beam 28, emitted in between the first and third beams 26 and 30, comprises both green and blue components. However, it will be appreciated that other frequency laser beams could be used including for example infra red laser beams. The only requirement is that the laser beams comprise wavelengths of light that are sufficiently different from each other such that the light detection system can distinguish between them.

The LDA is arranged such that all the laser beams' paths cross at the same point. Thus, laser beam one 26 and laser beam three 30 are emitted at substantially the same angle towards laser beam three 28. The region where the beams intersect 32, which can be referred to as the measurement volume, is indicated in FIG. 3 by a dotted circle.

Figure 3A:
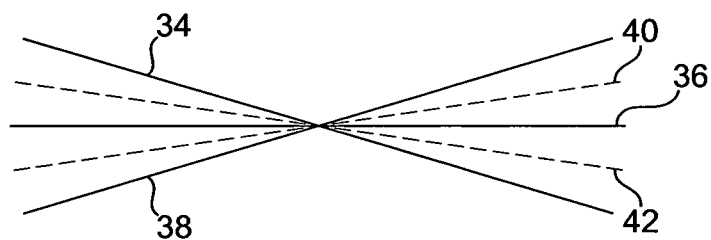

FIG. 3A shows the measurement volume in detail. Solid lines 34, 36 and 38 represent laser beams 26, 28 and 30 illustrated in FIG. 3 respectively.

It will be appreciated that two interference fields (not shown) will be created in the measurement volume, one by the interference of green light and one by the interference of blue light. Thus, interference fields will be created with fringes parallel to the bisector of beams one and two, 34 and 36, and beams two and three, 36 and 38.

As discussed with reference to FIG. 2, when particles carried by the flow pass through the fringes they scatter light. In this case, it will be appreciated that the use of different frequency light enables measurements from each of the two interference fields to be isolated.

Photodetectors (not shown) can be used to detect the scattered light, and the fluctuations in detected light intensity for each colour can be converted into a voltage signal, from which the velocity of the flow normal to the fringes of the respective interference fields can be determined.

Thus, the flow's velocity can be determined in two directions, perpendicular to each of the paths that run in between the respective interfering light beams. With respect to FIG. 3A, the two paths are indicated by dotted lines.

Thus, using the LDA arrangement illustrated in FIG. 3, two components of the local velocity vector can be determined.

The measurements made by LDAs can be used to acquire knowledge of inflow conditions. Sensitive changes in wind conditions can be detected. In particular, the angle of incidence of oncoming wind can be determined from LDA measurements, for example from measurements taken using the LDA arrangement described with respect to FIGS. 3 and 3A. This information can be used, in particular, to facilitate efficient and effective blade control.

The LDA data may be used in conjunction with data acquired from other laser measurement devices such as a hub or nacelle mounted lidar which measures wind conditions at points well in advance of the wind turbine to enable the turbine to react to strong gusts which could damage turbine components. Data from the LDAs may be used to verify Lidar measurements and to provide training data to improve the reliability and effectiveness of such a Lidar based remote sensing system.

Preferably, the LDA is incorporated into the blade so that any disturbance to the air flow over the blade caused by the device is minimised. Slots may be provided in the blade surface out of which laser beams may be emitted by the LDA. In an embodiment, the LDA may be encased in the blade. Windows may be provided in the blade surface through which laser beams emitted by the LDA can pass. The windows may be open or covered by a protective covering. Since the windows can be made relatively small, they will not influence the flow over the blade significantly. In the embodiment of FIG. 1, the processor 24 is remote from the LDA, for example at the blade root for ease of construction. Alternatively the processor may be arranged with other control apparatus in the nacelle or the spinner. Location in the spinner is advantageous as it is close to other electrical components with which it may need to communicate.

In some embodiments, the control system 28 may be part of a larger wind turbine control system. Such larger control systems are well known and may be used to control a large number of wind turbine variables. It will be appreciated that the control signal may be used for controlling various wind turbine variables. For example the speed of the rotor or the aerodynamic profile of the blade may be controlled. As discussed, the position of one or more control surfaces such as trailing edge flaps on the blade may be controlled to change the profile of the blade, or the shape of the blade may be altered in another way. Flaps may be located at any point on the blade for different purposes, for example on the leading edge or at the blade tip as well as the trailing edge. Slats and spoilers may also be controlled.

Figure 4:
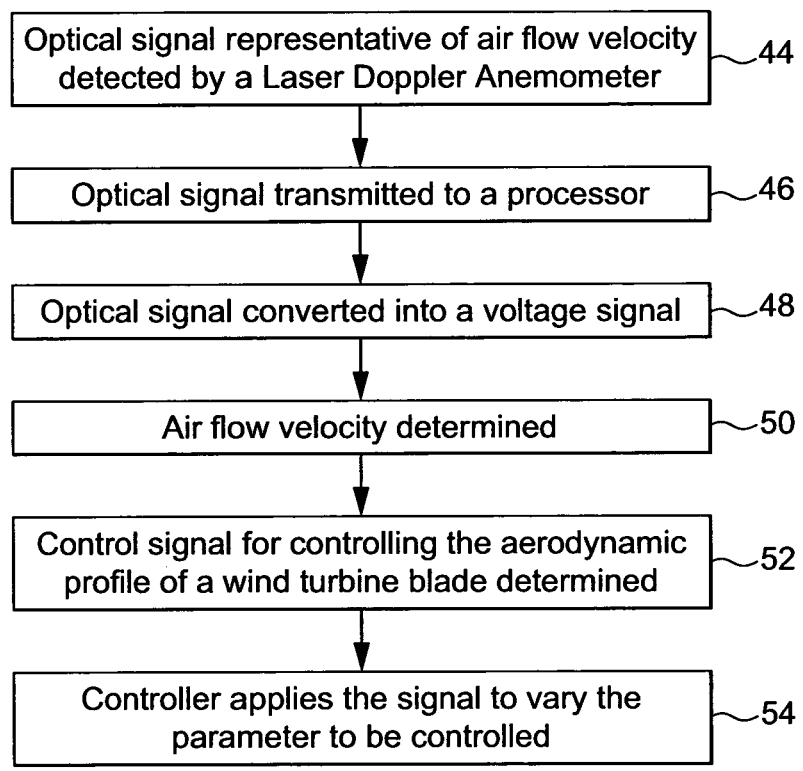
FIG. 4 is a flow diagram showing a method of controlling a wind turbine blade embodying the invention.

FIG. 4 shows the steps that may be taken according to an embodiment of the invention to control a wind turbine variable such as the aerodynamic profile of a blade. At step 44 light scattered from the measurement volume is detected by the LDA provided at the blade. At step 46 the detected optical signal is transmitted to the processor, preferably by an optical fibre and, at step 48, the processor converts the optical signal into a voltage signal. That is, fluctuations in detected light intensity are converted into fluctuations in a voltage signal from which, at step 50, the air flow velocity is determined. At step 52 the air flow measurements are used to determine a control signal for controlling a wind turbine variable such as the aerodynamic profile of a wind turbine blade, for example for controlling a trailing edge flap. At step 54 a controller applies this signal to vary the parameter to be controlled.

Embodiments of the invention enable more accurate determination of air flow properties in the region of the leading edge of a rotor blade. In particular accurate flow measurements can be made close to the blade surface and laser doppler anemometry allows precise measurements to be taken without substantially disturbing the flow being measured. In particular, the angle of incidence of oncoming wind may be determined from LDA measurements. By using lasers of different frequencies for example, more than one air flow velocity components may be determined. Preferred embodiments of the invention in which the LDA device is incorporated into the blade further minimise the influence of the detection system on air flow over the blade. Preferably the LDA is provided in the blade and windows are provided in the blade surface through which laser beams can be emitted by the LDA. The windows can be made very small so that they do not influence the flow significantly.

Thus, embodiments of the invention have the advantage that wind turbine variables, such as blade profile, can be controlled more effectively. Control can be based on various, accurate air flow measurements. The LDA device can be arranged such that it does not interfere substantially with air flow over the blade. In addition, embodiments of the invention have the advantage that they are more reliable than the 5-hole pitot tube approach used previously, require less maintenance and minimise the risk of a lightening strike.

Various modifications and alternatives to the embodiments described are possible and will occur to those skilled in the art. As discussed, various types of LDA systems may be used for detecting air flow in the region of the leading edge of the rotor blade. Various wind turbine variables may also be controlled. The system may be used to control the rotor speed or any control surface on the blade which can alter the aerodynamic profile of the blade.

The invention claimed is:

1. A system for control of a wind turbine comprising a Laser Doppler Anemometer arranged at a rotor blade to measure air flow in the region of the leading edge of the blade and a processor for determining therefrom a control signal for controlling the wind turbine.

2. The system according to claim 1, wherein the control signal controls a blade variable.

3. The system according to claim 1, wherein the Laser Doppler Anemometer is provided in the blade.

4. The system according to claim 1, wherein a window is provided on the blade surface and the Laser Doppler Anemometer is provided inside the blade, the Laser Doppler Anemometer being arranged to emit a laser beam through the window.

5. The system according to claim 1, wherein the Laser Doppler Anemometer measures more than one component of the air flow velocity vector.

6. The system according to claim 1, wherein the Laser Doppler Anemometer measures the angle of incidence of oncoming wind.

7. The system according to claim 1, comprising a plurality of Laser Doppler Anemometers spaced along the leading edge of the blade.

8. The system according to claim 7, wherein the plurality of Laser Doppler Anemometers are spaced substantially equidistantly along the blade.

9. The system according to claim 7, wherein a signal output by one of the plurality of Laser Doppler Anemometers is weighted in accordance with measurements made by adjacent Laser Doppler Anemometers.

10. The system according to claim 1, wherein the blade comprises a control surface and the control signal controls the position of the control surface.

11. The system according to claim 10, wherein the control surface is a trailing edge flap.

12. A wind turbine having a control system according to claim 1.

13. A system for control of a wind turbine comprising a Laser Doppler Anemometer arranged to measure air flow in the region of the leading edge of a rotor blade and a processor for determining therefrom a control signal for controlling the wind turbine, wherein the Laser Doppler Anemometer comprises a laser source arranged at the wind turbine rotor hub and optic fiber arranged within the rotor blade for communicating laser light emitted by the laser source to at least one point along the leading edge of the blade, the point along the leading edge of the blade being a window on the blade surface.

14. The system according to claim 13, comprising a plurality of optic fibres arranged within a plurality of rotor blades, each optic fibre communicating laser light enabled by the laser source to at least one point along the leading edge of a respective rotor blade.

15. A method for controlling a wind turbine comprising: measuring air flow in the region of the leading edge of the blade with a Laser Doppler Anemometer arranged at a rotor blade; determining therefrom a control signal based on the measurement; and applying the control signal to a variable wind turbine parameter to control the wind turbine.

16. The method according to claim 15, wherein the control signal is applied to control the position of a trailing edge flap.

17. A method for controlling a wind turbine comprising:

measuring air flow in the region of the leading edge of the blade with a Laser Doppler Anemometer, wherein the Laser Doppler Anemometer comprises a laser source arranged at the wind turbine rotor hub and optic fiber arranged within the rotor blade for communicating laser light emitted by the laser source to at least one point along the leading edge of the blade, the point along the leading edge of the blade being a window on the blade surface;

determining therefrom a control signal based on the measurement; and applying the control signal to a variable wind turbine parameter to control the wind turbine.

* * * * *